Figure 1:
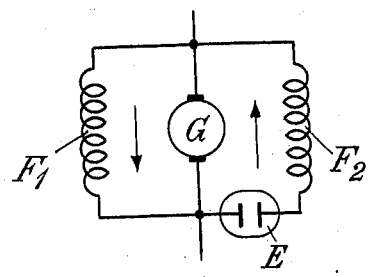

Aug. 29, 1933.   O. P. KOCH   1,924,364
ELECTRIC MACHINE
Filed Jan. 23, 1932

INVENTOR
OTTO P. KOCH, DECEASED
BY
EMMA KOCH, ADMINISTRATRIX
BY  R.C. Hopgood
ATTORNEY Patented Aug. 29, 1933

1,924,364

UNITED STATES PATENT OFFICE 1,924,364

ELECTRIC MACHINE

Otto Paul Koch, deceased, late of Berlin-Tempelhof, Germany, by Emma Koch, geb. Wilke, administratrix, Berlin-Tempelhof, Germany, assignor to C. Lorenz Aktiengesellschaft, Berlin-Tempelhof, Germany Application January 23, 1932, Serial No. 588,398, and in Germany January 24, 1931

5 Claims. (Cl. 171—223)

Arrangements for the automatic regulation of electric machines have been proposed, which utilize the property of iron-hydrogen resistances of keeping the current constant within a certain range despite a varying voltage. Since iron-hydrogen resistances, as is well-known, work rather sluggishly, such regulating devices are not sufficiently accurate.

The present invention has for its object to provide an automatic regulating device for electric machines which is far more sensitive and works with considerably greater accuracy. The system according to the invention renders it possible to regulate the voltage produced by a generator or the speed of a motor or converter.

According to the present invention, electric generators, motors and the like machines are provided with two field windings, one of which is connected in series with a discharge path of substantially no heat inertia.

As is well-known, discharge paths have different resistance characteristics. They may have a positive characteristic, in which case an increasing voltage produces an increasing current, or a negative characteristic. In the latter case the current falls with an increasing voltage. If, in a generator for instance, a discharge path having a positive characteristic is connected in the circuit of a field winding, or if a discharge path having a negative characteristic is connected in series with a field winding, having a positive resistance characteristic such that the resultant resistance of the discharge path and the field winding has a positive characteristic, such a field winding must act in opposition to the second field winding. When the terminal voltage of the generator increases, the total field is then weakened, while on the other hand, when the generator voltage falls, the field is strengthened. The increase of the opposing field is more rapid than the increase of the main field. If, on the contrary, the discharge path has a negative resistance characteristic, which is not compensated by the positive characteristic of the field winding with which it is connected in series that is, if the whole branch has a negative characteristic, both field windings must be traversed by the current in the same direction, so that on increase of generator voltage, the field may again be weakened while, if the voltage drops, the field is strengthened. In order to increase the sensitivity of the regulating system in this case, the discharge path and the resistance of the counter-winding are best chosen in such a manner that quite small variations of the voltage are sufficient to effect a comparatively great variation in the field current. The alternating current resistance must therefore be made as small as possible. It is preferable to make the resultant characteristic of the discharge path and the counter-winding together as straight as possible, for instance, such that a voltage variation of several hundredths produces a current variation which is a multiple of this.

It will be seen that regulation of electric machines by means of discharge paths in this manner is extremely sensitive because, on the one hand, the regulating member works practically without inertia and, on the other hand, unnoticeably small deviations from the values to be maintained are sufficient to actuate the regulating means.

Figure 2:
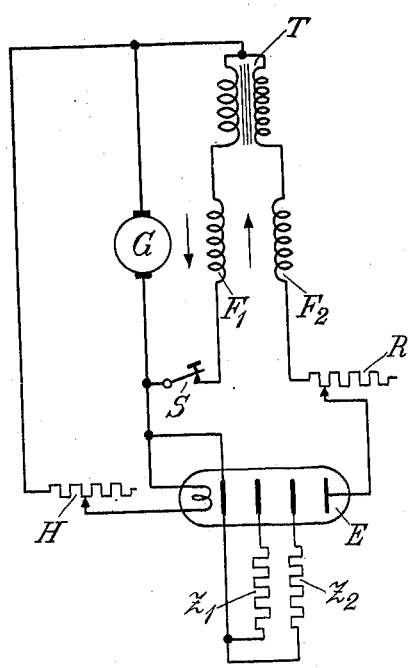

The invention will be more clearly understood from the following description relating to two embodiments thereof illustrated diagrammatically in the accompanying drawing. Fig. 1 shows one of these embodiments. Fig. 2 represents the other embodiment.

Fig. 1 shows an arrangement for regulating the voltage of a generator. Connected in parallel with the terminals of the generator G, on the one hand, is the field winding F1 and, on the other hand, the field winding F2 in series with which is the discharge path E. Suppose the discharge path E and the field winding F2 together to have a positive resistance characteristic; then the current flowing through them increases as the voltage increases. If now the voltage at the terminals of the generator G tends to increase, the exciting field which is produced by the two windings F1 and F2 must be weakened. In order that the increase of current which is caused by the discharge path E at an increasing voltage, may be utilized for weakening the field, the winding F2 must be connected in opposition to the winding F1, as is indicated by the arrows. The total field produced is therefore the difference of the fluxes produced by the two windings, so that the current which flows through the winding F2 and which is increased in strength by the discharge path E causes weakening of the total field. If the characteristic of the discharge path E is correctly adjusted therefore, it keeps the voltage produced by the generator practically constant in this manner.

In Fig. 2 is shown another practical embodiment of the invention. In this figure, the winding F1 is shown connected in parallel with the generator G through a switch S, while the field winding F2 is connected in parallel with the generator through the discharge path E. In addition to this, there is connected in series with E and F2 an adjustable ohmic resistance R which serves to adjust the resistance characteristic of the discharge path E in accordance with the voltage characteristic of the generator. A discharge tube well-known per se having one indirectly heated main electrode and intermediate electrodes, is employed as the discharge path. The intensity with which the heated electrode is heated can be adjusted by means of the adjustable resistance H. Heating of the electrode reduces the voltage necessary for ignition of the discharge tube. The second main electrode, which is connected to the resistance R, may also be indirectly heated. In order to obtain a low ignition voltage, the ohmic resistances Z1 and Z2 are inserted. The mode of operation of this arrangement for the regulating process is the same as the one described with reference to Fig. 1.

As has already been mentioned, the voltage necessary for the ignition of the discharge tube, is often higher than the normal operating voltage. In order to effect the ignition, the inductive impulse which is produced by the winding F1 when the switch S is opened may be used. However, if this impulse is not sufficient, it can be increased as desired by inductively coupling the circuit of the field winding F1 to that of the field winding F2 through the transformer T. When it is desired to set the arrangement into operation, the switch S is opened for a short time and closed again while the generator is producing a sufficiently high voltage. The sudden excess voltage thereby produced in the winding F1 is augmented by the transformer T and starts the ignition of the discharge tube E. At the same time, response of the tube E brings the winding F2 into operation and the latter then carries out the regulation of the voltage of the generator in the manner already described. If a sufficiently high voltage is available for carrying out the ignition process, the heating of one or more of the discharge tube electrodes may be omitted in certain circumstances, provided that its output is not rendered too small thereby.

The arrangement described with reference to Fig. 2 for the regulation of a generator may also be used to keep constant the speed of a motor or converter. The circuit connection of the motor and the discharge tube is the same as in the case of the generator, it merely being necessary to exchange the connecting terminals of one field winding F1 or F2. This is necessary for the following reasons:

If the motor tends to run more quickly owing to an increase in the voltage applied to it, its field must be further increased in order that it may retain the original speed. If the discharge tube has a positive characteristic, an increase in the voltage at the discharge tube, produces a rapid increase in the current. The two field windings must therefore act in the same sense in order that the field may be strengthened if the terminal voltage and consequently the speed, increase. On the contrary, the two field windings must act in opposition if the discharge path and field winding together have a negative characteristic, in order that the current drop caused by the discharge path when the terminal voltage increases may again strengthen the total field.

If in larger machines, one discharge path will not supply sufficient current to the field winding serving for regulation, several discharge paths may be connected in parallel.

What is claimed is:

1. In an electric machine, two field windings and a discharge tube connected in series with one of these windings, such tube having two main electrodes and intermediate electrodes, and ohmic resistances interconnecting these intermediate electrodes.

2. In an electric machine, two field windings and a discharge tube connected in series with one of these windings, such tube having two main electrodes and intermediate electrodes, ohmic resistances interconnecting these intermediate electrodes and means for heating the said tube indirectly.

3. In an electric machine, two field windings and a discharge tube connected in series with one of these windings, such tube having two main electrodes and intermediate electrodes, ohmic resistances interconnecting these intermediate electrodes, means for heating the said tube indirectly, and a series resistance for adjusting this heating means.

4. In an electric machine the combination of the machine proper with two field windings coupled to each other by a transformer, a discharge path connected in series with one of these windings and having substantially no heat inertia, and means governing the connection of the other winding to the machine proper.

5. In an electric machine the combination of the machine proper with two inductively coupled field windings, a discharge path connected in series with one of said windings, and means governing the connection of the other winding to the machine proper.

EMMA KOCH, GEB. WILKE,
*Administratrix of the Estate of Otto Paul Koch, Deceased.*